(12) United States Patent
Iles

(10) Patent No.: US 9,979,337 B2
(45) Date of Patent: May 22, 2018

(54) METHOD OF LOADSHEDDING FOR A VARIABLE SPEED, CONSTANT FREQUENCY GENERATOR

(71) Applicant: Generac Power Systems, Inc., Waukesha, WI (US)

(72) Inventor: Robert Iles, Delafield, WI (US)

(73) Assignee: Generac Power Systems, Inc., Waukesha, WI (US)

( * ) Notice: Subject to any disclaimer, the term of this patent is extended or adjusted under 35 U.S.C. 154(b) by 496 days.

(21) Appl. No.: 14/260,530

(22) Filed: Apr. 24, 2014

(65) Prior Publication Data

US 2015/0311843 A1    Oct. 29, 2015

(51) Int. Cl.
*H02P 9/48* (2006.01)
*H02P 9/04* (2006.01)
*H02P 9/00* (2006.01)

(52) U.S. Cl.
CPC ............... *H02P 9/04* (2013.01); *H02P 9/007* (2013.01); *H02P 9/48* (2013.01)

(58) Field of Classification Search
CPC .... H02P 9/04; H02P 9/007; H02P 9/10; H02P 9/107; H02P 9/00; H02P 9/006; F02D 29/06
USPC ...................................................... 290/40 B
See application file for complete search history.

(56) References Cited

U.S. PATENT DOCUMENTS

| | | | |
|---|---|---|---|
| 4,324,987 A | 4/1982 | Sullivan et al. | |
| 4,877,273 A | 10/1989 | Wazaki et al. | |
| 5,462,225 A | 10/1995 | Massara et al. | |
| 5,536,976 A | 7/1996 | Churchill | |
| 6,075,459 A * | 6/2000 | Saarem | F02N 11/0807 123/179.2 |
| 6,172,432 B1 | 1/2001 | Schnackenberg et al. | |
| 6,510,369 B1 | 1/2003 | Lacy | |
| 6,624,532 B1 | 9/2003 | Davidow et al. | |
| 6,631,310 B1 | 10/2003 | Leslie | |
| 6,671,586 B2 | 12/2003 | Davis et al. | |

(Continued)

FOREIGN PATENT DOCUMENTS

JP    06-335171    12/1994
JP    07-295626    11/1995

(Continued)

OTHER PUBLICATIONS

PCT/US2015/027251, International Search Report and Written Opinion, dated Jul. 22, 2015, 14 pages.

(Continued)

*Primary Examiner* — Viet Nguyen
(74) *Attorney, Agent, or Firm* — Boyle Fredrickson, S.C.

(57) ABSTRACT

A method of controlling operation of a variable speed, constant frequency generator system is disclosed. During operation, loads may be added to or removed from the output of the generator system. A controller monitors the power output by the generator system and detects a change in the output power exceeding a predefined threshold. The change indicates the addition of a large electrical load. The controller quickly detects the change in power output and activates a relay to disconnect the load from the generator system. The controller then accelerates the engine of the generator system to maximum speed and reconnects the load to the output of the generator system.

15 Claims, 4 Drawing Sheets

(56) References Cited

U.S. PATENT DOCUMENTS

| | | |
|---|---|---|
| 6,747,368 B2 | 6/2004 | Jarrett |
| 6,813,525 B2 | 11/2004 | Reid et al. |
| 6,832,135 B2 | 12/2004 | Ying |
| 6,891,478 B2 | 5/2005 | Gardner |
| 7,132,951 B2 | 11/2006 | Ziejewski et al. |
| 7,242,114 B1 | 7/2007 | Cannon et al. |
| 7,356,384 B2 | 4/2008 | Gull et al. |
| 7,365,443 B2* | 4/2008 | Gendron .................. H02P 9/08 290/31 |
| 7,460,930 B1 | 12/2008 | Howell et al. |
| 7,528,503 B2 | 5/2009 | Rognli |
| 8,135,499 B2 | 3/2012 | Haugh |
| 8,248,203 B2 | 8/2012 | Hanwright et al. |
| 8,260,471 B2 | 9/2012 | Storch et al. |
| 8,324,755 B2 | 12/2012 | Stair et al. |
| 8,369,998 B2 | 2/2013 | Drake et al. |
| 8,373,569 B2 | 2/2013 | Gilpatrick |
| 8,410,633 B2 | 4/2013 | Batzler et al. |
| 8,417,393 B2 | 4/2013 | Drake et al. |
| 8,433,452 B2 | 4/2013 | Fleck et al. |
| 2002/0117859 A1* | 8/2002 | Kraus .................. F02B 5/02 290/41 |
| 2003/0042794 A1 | 3/2003 | Jarrett |
| 2003/0075982 A1 | 4/2003 | Seefeldt |
| 2005/0140142 A1* | 6/2005 | Welches .................. H02J 3/30 290/41 |
| 2005/0216131 A1 | 9/2005 | Wesley et al. |
| 2005/0275354 A1* | 12/2005 | Hausman, Jr. ........ H05B 39/048 315/291 |
| 2006/0229768 A1 | 10/2006 | Chassin et al. |
| 2007/0010916 A1 | 1/2007 | Rodgers et al. |
| 2007/0021874 A1 | 1/2007 | Rognli et al. |
| 2007/0222295 A1 | 9/2007 | Wareham et al. |
| 2008/0258558 A1 | 10/2008 | Lathrop et al. |
| 2009/0096431 A1* | 4/2009 | Verschuur .................. H02P 9/06 322/8 |
| 2009/0240377 A1 | 9/2009 | Batzler et al. |
| 2010/0019574 A1 | 1/2010 | Baldassarre et al. |
| 2010/0038907 A1* | 2/2010 | Hunt .................. E21B 41/0085 290/7 |
| 2010/0114387 A1 | 3/2010 | Chassin |
| 2010/0194118 A1* | 8/2010 | Radtke .................. B23K 9/10 290/40 B |
| 2010/0241283 A1* | 9/2010 | Desai .................. H02J 7/1415 700/295 |
| 2010/0312414 A1* | 12/2010 | Kumar .................. H02J 3/14 700/295 |
| 2011/0006547 A1 | 1/2011 | McLean et al. |
| 2011/0054707 A1 | 3/2011 | Batzler et al. |
| 2011/0175372 A1* | 7/2011 | Eaton .................. H02P 9/04 290/40 B |
| 2011/0254370 A1 | 10/2011 | Wischstadt |
| 2011/0298285 A1 | 12/2011 | Lim et al. |
| 2012/0029717 A1 | 2/2012 | Cox et al. |
| 2012/0049638 A1* | 3/2012 | Dorn .................. H02J 3/42 307/87 |
| 2012/0053739 A1 | 3/2012 | Brian et al. |
| 2012/0074780 A1 | 3/2012 | Fleck |
| 2012/0104770 A1* | 5/2012 | Jacob .................. B60L 11/14 290/40 B |
| 2012/0104848 A1 | 5/2012 | Lathrop et al. |
| 2012/0109395 A1 | 5/2012 | Finch et al. |
| 2012/0139264 A1* | 6/2012 | Riihimaki .................. H02P 9/04 290/40 B |
| 2012/0175876 A1* | 7/2012 | Pendray .................. F02D 19/02 290/41 |
| 2012/0175955 A1 | 7/2012 | Carralero et al. |
| 2012/0205985 A1 | 8/2012 | Frampton et al. |
| 2012/0306457 A1* | 12/2012 | Haggerty .................. B60K 6/485 322/29 |
| 2013/0026840 A1 | 1/2013 | Arditi et al. |
| 2013/0035887 A1 | 2/2013 | Fan |
| 2013/0270908 A1 | 10/2013 | Wedel et al. |
| 2014/0297155 A1* | 10/2014 | Chen .................. F02C 9/28 701/100 |

FOREIGN PATENT DOCUMENTS

| | | |
|---|---|---|
| JP | 2013-106449 | 5/2013 |
| WO | 0137392 | 5/2001 |

OTHER PUBLICATIONS

"Technical Manual—RTS Automatic Transfer Switch", 27 pages, undated.

"Instruction Manual—Nexus Remote Monitor", Generac Power Systems, Inc., P.O. Box 8, Waukesha, WI 53187, Revision A, Jul. 23, 2010, 12 pages.

"Instruction Manual—Wireless Display System", Generac Power Systems, Inc., P.O. Box 8, Waukesha, WI 53187, Revision A, Jun. 28, 2010, 16 pages.

* cited by examiner $i$ = instantaneous AC current $v$ = instantaneous AC current $P$ = Average AC power

METHOD OF LOADSHEDDING FOR A VARIABLE SPEED, CONSTANT FREQUENCY GENERATOR

FIELD OF THE INVENTION

This invention relates generally to engine-driven, electrical generators, and in particular, to a method for shedding a load from a variable speed, constant frequency generator.

BACKGROUND AND SUMMARY OF THE INVENTION

Electrical generators are used in a wide variety of applications. Typically, an individual electrical generator operates in a stand-by mode wherein the electrical power provided by a utility is monitored such that if the commercial electrical power from the utility fails, the engine of the electrical generator is automatically started causing the alternator to generate electrical power. When the electrical power generated by the alternator reaches a predetermined voltage and frequency desired by the customer, a transfer switch transfers the load imposed by the customer from the commercial power lines to the electrical generator. As is known, most residential electric equipment in the United States is designed to be used in connection with electrical power having a fixed frequency, namely, sixty (60) hertz (Hz).

Typically, electrical generators utilize a single driving engine coupled to a generator or alternator through a common shaft. Upon actuation of the engine, the crankshaft rotates the common shaft so as to drive the alternator that, in turn, generates electrical power. The frequency of the output power of most prior electrical generators depends on a fixed, operating speed of the engine. Typically, the predetermined operating speed of an engine for a two-pole, stand-by electrical generator is approximately 3600 revolutions per minute to produce the rated frequency and power for which the unit is designed. However, in situations when the applied load is the less than the rated kilowatt load for which the unit is designed, the fuel-efficiency of the engine will be less than optimum. As such, it can be appreciated that it is highly desirable to vary the operating speed of the engine of an electrical generator to maximize fuel efficiency, and thus reduce CO2 emissions, of the engine for a given load. Further, operation of the engine-driven, electrical generator at its predetermined operating speed can produce unwanted noise. It can be appreciated that reducing the operating speed of the engine of an electrical generator to correspond to a given load will reduce the noise associated with operation of the engine-driven, electrical generator.

Operating the engine at a reduced speed does, however, have certain drawbacks. Operation at a reduced speed results in a lower power output from the generator. Further, the load applied to the generator may change after the initial determination of an optimum operating speed. For example, a sump pump, a furnace, or another electrical load may be switched on, creating an additional power demand on the generator. Even if the additional demand may be within the capacity of the generator system when the engine is operating at maximum speed, the additional demand may be in excess of the capacity of the generator when it is operating at the reduced speed. If the change in the power demand is too great, it may cause the engine to begin to slow and/or to stall.

Therefore, it is a primary object and feature of the present invention to provide a method for rapidly detecting a change in the power demanded from the generator system as a result of an additional load being applied to the generator system.

It is another primary object and feature of the present invention to provide a method that allows the engine to accelerate to maximum speed and, thereby, generate maximum power such that the generator system may provide power to the new load.

In accordance with the present invention, a method of controlling an engine-driven, electrical generator system configured to generate an alternating current (AC) power at a desired output frequency for multiple electrical loads is disclosed. A value of the AC power output by the generator system is determined at least once during each electrical cycle of the AC power. A change in the value of the AC power output greater than a preset threshold is detected, and a switch is opened to disconnect at least one of the electrical loads from the generator system responsive to detecting the change in the value of the AC power output greater than the preset threshold. The engine is accelerated to a maximum operating speed, and the switch is closed to reconnect the electrical load to the generator system.

According to another aspect of the present invention, the generator system outputs a control signal responsive to detecting the change in the value of the AC power output, and the control signal is provided to the switch to open and close the switch. The step of detecting the change in the value of the AC power output may be done within two electrical cycles of the AC power. The engine may operate at the maximum operating speed for a predefined time after accelerating to the maximum operating speed, and the operating speed of the engine may be varied as a function of the fuel consumption of the generator system upon completion of the predefined time. Further, the value of the AC power output may be determined by a calculation of real power, apparent power, or a combination thereof.

According to another embodiment of the invention, a method of controlling an engine-driven, electrical generator system is disclosed. The engine of the generator system is configured to operate at an engine speed and the generator system is configured to generate an alternating current (AC) power having a desired output frequency. The method includes the steps of running the engine at a first engine speed, connecting a load to an output of the generator system, and detecting a change in the value of the AC power output greater than a preset threshold within two electrical cycles of the AC power. Optionally, a decrease in the engine speed greater than a preset threshold may be detected. After detecting either the change in the value of the AC power output or the decrease in the engine speed, at least a portion of the load is disconnected from the output of the generator system. The engine is accelerated to a maximum operating speed, and the disconnected portion of the load is reconnected to the output of the generator system.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF THE DRAWINGS

The various features and advantageous details of the subject matter disclosed herein are explained more fully with reference to the non-limiting embodiments described in detail in the following description.

Figure 1:
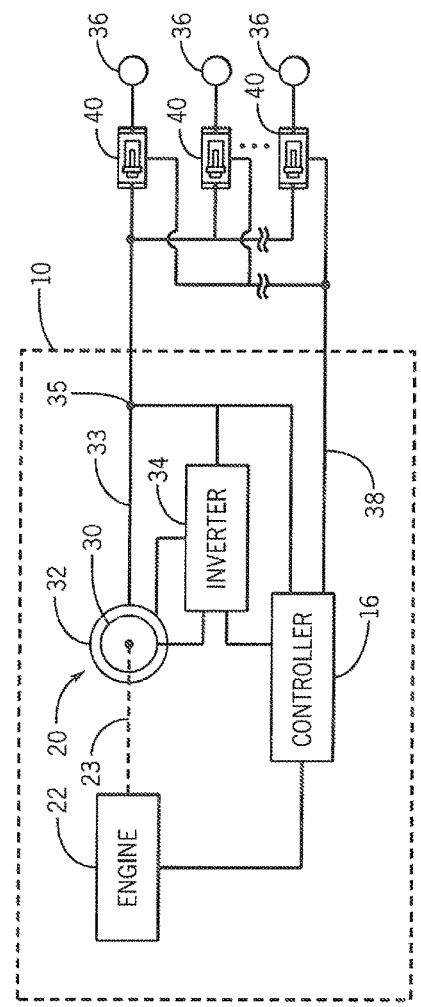
FIG. 1 is a block diagram representation of a system for connecting loads to a variable speed, constant frequency generator according to one embodiment of the invention.
Figure 4:
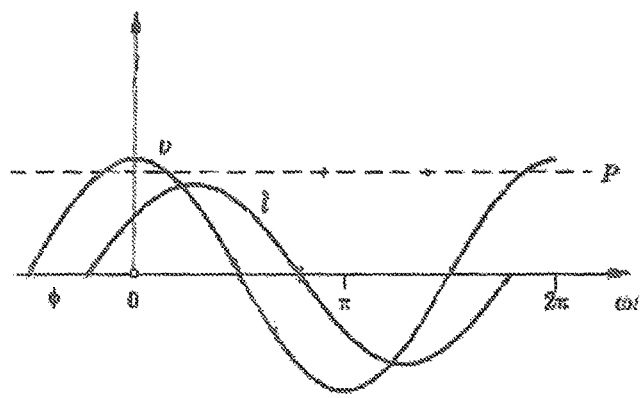
FIG. 4 is a graphical representation of the instantaneous AC current, the instantaneous AC voltage and the average AC power at the output of the generator.

Referring to FIG. 1, an engine-driven, electrical generator system for performing the methodology of the present invention is generally identified by the reference numeral 10. The generator system 10 includes an alternator 20 defined by a cylindrical rotor 30 rotatably received within a stator 32. By way of example, the rotor 30 may include a three-phase winding supplied by an inverter 34. The stator 32 includes a main winding, which is similarly a three-phase winding, wound in coils over an iron core and an excitation or quadrature winding shifted 90 degrees from the main winding. Rotation of the rotor 30 generates a moving magnetic field around the stator 32 which, in turn, induces a voltage difference between the windings of the stator 32. As a result, alternating current (AC) power is provided across the output 33 of the stator 32, FIG. 4. The output 33 of the stator 32 is configured to connect to one or more loads 36 for supplying AC power thereto.

Each load 36 is connected to the generator system 10 via a switch 40. The switch 40 may be an electronically-activated mechanical relay, a solid-state switch, or any other suitable switch according to the application requirements. The switch 40 includes at least two operating modes. In a first operating mode, the switch 40 connects the load 36 and establishes an electrical connection between the generator system 10 and the load 36. In a second operating mode, the switch 40 disconnects the load 36 and breaks the electrical connection between the generator system 10 and the load 36. As illustrated, multiple loads 36 may each be connected by separate switches 40. Optionally, a single switch 40 may be used to connect multiple loads 36 to the generator system 10. The switch 40 is configured to receive a control signal 38 from a control unit, for example the controller 16. The switch 40 may be automatically operated to transition between a first operating mode, in which the load 36 is connected with the generator system 10, and a second operating mode, in which the load 36 is disconnected from the generator system 10. An actuator, such as a solenoid, may be energized by the control signal 38 to move the switch 40 between the two operating modes. As illustrated, a single control signal 38 may be provided to multiple switches 40. Optionally, the control unit may generate separate control signals 38 for each switch 40. In the illustrated embodiment, the control unit is a controller 16 for the generator system 10. Optionally, the control unit may be a separate load-shed controller configured to monitor operation of the generator system 10 and generate the control signals 38 as discussed in more detail below.

The generator system 10 further includes an engine 22. As is conventional, the engine 22 receives fuel such as diesel, natural gas, or liquid propane vapor through an intake. The fuel provided to the engine 22 is compressed and ignited within each of the cylinders responsive to a firing signal so as to generate reciprocating motion of the pistons of the engine 22. The reciprocating motion of the pistons of the engine 22 is converted to rotary motion by a crankshaft. The crankshaft is operatively coupled to the rotor 30 of the alternator 20 through a shaft 23 such that as the crankshaft is rotated by operation of the engine 22, the shaft 23 drives the rotor 30 of the alternator 20. As is known, the frequency of the AC power at output 33 of the stator 32 is dependent upon the number of poles and the rotational speed of rotor 30 which corresponds, in turn, to the speed of engine 22. The engine speed corresponding to a particular frequency of the AC power is called the synchronous speed (Ns) for that frequency. By way of example, the synchronous speed for a two pole rotor producing AC power at 60 hertz at the output 33 of the stator 32 is 3600 revolutions per minute.

It is noted that the engine 22 of the generator system 10 does not operate at a fixed constant speed, but rather, operates at a speed that varies in accordance with the load magnitude. In other words, at low loads, where relatively little current is required by one of the loads 36 from the alternator 20, the engine speed is relatively low. At higher loads, where greater current is drawn from the alternator 20, the engine speed is higher. While it can be appreciated that the speed of the engine 22 can be readily adjusted to optimize the fuel consumption and reduce the noise level associated with operation of the engine 22, these changes in the engine speed, in turn, cause the frequency and voltage at the output 33 of the alternator 20 to change. However, even when operating in a stand-alone application, the frequency and voltage of the AC power produced at the output 33 of the stator 32 must remain relatively constant and substantially within pre-established upper and lower limits (e.g., 56-60 Hz, and 108-127 Vrms).

The generator system 10 includes a controller 16 operatively connected to a current transformer 35 and to the throttle actuator (not shown) of the engine 22. The current transformer 35 measures a magnitude of the load at the output 33 of the stator 32 and supplies a signal corresponding to the same to the controller 16. It is intended for the controller 16 to calculate the optimum fuel consumption for the engine 22 for a given load 36. It can be appreciated that minimum fuel consumption typically occurs at approximately ⅔ of the synchronous speed (Ns) of the engine 22. As such, for a two pole rotor producing 60 hertz AC power at the output 33 of the stator 32, the minimum fuel consumption occurs at an engine speed of 2400 revolutions per minute. In response to instructions received from the controller 16, the throttle actuator coupled to engine 22 increases or decreases the speed of the engine 22 to optimize the fuel consumption of the engine 22. It is also contemplated for the controller 16 to receive various additional inputs indicative of the engine operating conditions and to provide additional control commands (e.g., an engine shutdown command in the event oil pressure is lost) to the engine 22.

The frequency of the AC voltage at the output 33 of the stator 32 is a function of both the rotor speed (Nr) and the frequency of the voltage applied to the rotor windings. As previously indicated, it is desirable to maintain a relatively constant frequency and voltage of the AC power produced at the outputs 33 of the stator 32. Therefore, if the controller 16 varies the rotor speed (Nr) to achieve improved fuel consumption and/or noise reduction in the generator system 10, the frequency of the voltage applied, to the rotor windings must also vary to maintain the relatively constant output frequency. The inverter 34 is operatively connected to the rotor windings to provide the variable frequency voltage required to maintain the relatively constant frequency at the output 33 of the stator 32. Given the rotor speed (Nr), the traveling wave of magnetic flux produced by the three phase currents supplied by the inverter 34 relative to the rotor 30 is equal to the difference between the synchronous speed (Ns) and the rotor speed (Nr). As such, the stator 32 "sees" the magnetic flux wave travelling at the synchronous speed (Ns) independent of the rotor speed (Nr) and will produce a constant frequency at the output 33 thereof. For a rotor 30 having two poles, the required frequency for the AC power supplied by the inverter 34 to the rotor windings to produce a traveling wave of magnetic flux that causes the outputs of the stator 32 to have a constant frequency may be calculated according to the equation:

$$f_{inverter} = \frac{N_s - N_r}{60} \qquad \text{Equation (1)}$$

wherein: $f_{inverter}$ is the frequency of the AC power supplied by the inverter 34 to the rotor windings; $N_s$ is the synchronous speed; and $N_r$ is the rotor speed.

In order to deliver constant voltage and current at the output 33 of the stator 32, the AC power supplied by the inverter 34 may be calculated according to the equation:

$$P_{inverter} = P_{stator} \times \frac{N_s - N_r}{N_r} \qquad \text{Equation (2)}$$

wherein: $P_{inverter}$ is the AC power supplied by the inverter 34 or slip power; $P_{stator}$ is the AC power at the output 33 and the quadrature winding of the stator 32; $N_s$ is the synchronous speed; and $N_r$ is the rotor speed.

In view of the foregoing, it can be appreciated that by controlling the magnitude and the frequency of the AC power supplied to the rotor windings by the inverter 34, the frequency and voltage of the AC power produced by the generator system 10 at the output 33 of the stator 32 is controlled.

In operation, the generator system 10 receives a command to begin operation. The command may be generated internally or externally, for example, upon detection of a failure in the utility grid or for a scheduled operation. The engine 22 is started such that the alternator 20 generates electrical power at the output 33 of the stator 32, as heretofore described. The controller 16 may initially accelerate the engine 22 up to a maximum operating speed and achieve a stable output power. One or more electrical loads 36 are then connected to the output 33 to receive power from the generator system 10. The controller 16 monitors the magnitude of the load 36 and calculates the optimum fuel consumption for the engine 22. In response to instructions received from the controller 16, the throttle actuator coupled to the engine 22 increases or decreases the engine speed within a predefined operating range to optimize the fuel consumption of the engine 22.

When the rotor 30 is rotating at synchronous speed (Ns), the inverter 34 must provide a stationary wave relative to the rotor 30 in order to produce the same magmetomotive force as produced by a normal constant speed generator. In this manner, the inverter 34 behaves as an automatic voltage regulator behaves in a conventional alternator which has to provide a magnetizing magnetomotive force, as well as, a component to oppose the armature reaction. Further, it can be appreciated that by utilizing the quadrature winding of the stator 32 to power the DC link of the inverter 34, the main windings of the stator 32 are kept free of harmonics which occur as a natural result of DC link. This, in turn, eliminates the need for additional filtering or for power factor correction upstream of the DC link.

It is desirable to maintain the frequency and amplitude of the voltage produced at the output 33 relatively constant. In order to maintain the frequency and amplitude of the voltage produced by the generator system 10 at the output of the stator 32 within the pre-established upper and lower limits, the controller 16 determines the frequency and magnitude of the slip power to be supplied to the rotor windings by the inverter 34. The frequency output by the inverter, referred to herein as an adjustment frequency, is the difference between the frequency of the voltage at the output 33 of the stator 32 generated as a result of the operating speed of the engine 22 and the desired frequency (e.g., 60 Hz). Thus, under the control of the controller 16, the inverter 34 generates an AC voltage having the desired magnitude at the adjustment frequency to provide the necessary slip power to the rotor windings. During operation of the generator system 10, the load 36 or loads 36 connected to the output 33 of the stator 32 may change. The generator system 10 may be connected, for example, to a residential or commercial building where the electrical loading varies over time. As the load 36 varies, the controller 16 continually determines the desired engine speed for optimal fuel consumption and generates a command signal to the engine 22 to operate at that desired engine speed. The inverter 34 similarly continually monitors the operating speed of the engine 22 and varies the adjustment frequency to maintain a constant frequency of the AC power at the output 33 of the stator 32.

However, the magnitude of the load 36 varies according to the type of load 36 connected to the generator system 10. A small electrical appliance or a single light may require a minimal amount of additional power output from the generator system 10 while a furnace or clothes dryer starting may require a significant amount of additional power output from the generator system 10. When the engine 22 is not operating at maximum speed, the generator system 10 is not capable of producing its rated power output. Thus, even though the generator system 10 may have sufficient capacity to power a load 36 when the engine 22 is operating at maximum speed, it may not have sufficient capacity to power the load 36 when the engine 22 is operating at a reduced speed to conserve fuel. If a large load 36 is applied to the generator system 10 while the engine 22 is operating at the reduced speed, the load 36 may be sufficient to cause the engine 22 to slow and/or stall.

Figure 2:
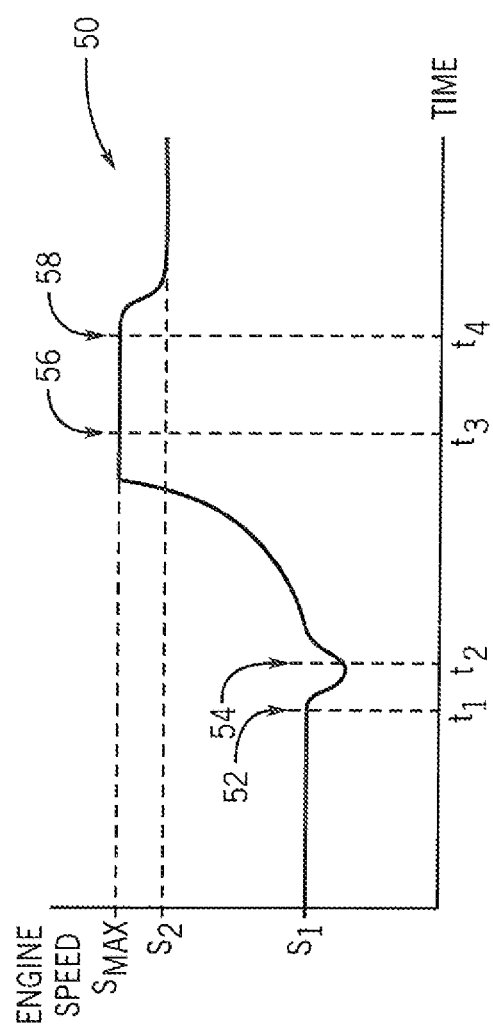
FIG. 2 is a graphical representation of the engine speed during a load shedding event according to one embodiment of the invention.

According to one embodiment of the present invention, the controller 16 monitors operation of the generator system 10 and prevents the engine 22 from stalling when a large load 36 is connected. Optionally, a separate load-shed controller may be connected to the generator system 10 and manage the loads 36 connected to the generator system 10. One exemplary sequence of operation is illustrated in FIG. 2. The engine 22 of the generator system 10 is initially running at a first speed, $S_1$, which is less than the maximum operating speed, $S_{max}$, of the generator system 10. At a first time 52, a large load 36, or combination of loads 36, is connected to the generator system 10, and the engine speed begins to drop. The controller 16 is receiving a signal corresponding to and monitoring the load 36 at the output 33 of the stator 32. At a second time 54, when the controller detects a change in the power at the output 33 greater than a predefined threshold, it generates a control signal 38 to disconnect the load 36, or a portion of the loads 36, from the generator system 10. It is contemplated that the threshold may be set between about 40% and 100% of the rated load of the generator system 10. Optionally, the engine 22 may include a feedback device, such as an encoder or a resolver, providing a signal to the controller 16 corresponding to the angular position and/or speed of the engine 22. The controller 16 may monitor the signal from the feedback device to detect the decrease in engine speed and to generate the control signal 38 to disconnect the load 36 from the generator system 10. Having disconnected the load 36 from the generator system 10, the controller 16 commands the engine 22 to accelerate to a maximum operating speed, $S_{max}$. Preferably, the controller 16 commands the engine 22 to accelerate at its maximum acceleration such that the engine 22 reaches the maximum operating speed, $S_{max}$, as quickly as possible. At a third time 56 and shortly after reaching the maximum operating speed, $S_{max}$, the controller 16 generates the control signal 38 to reconnect the load 36, or loads 36, to the generator system 10. The controller 16 starts a timer and keeps the engine speed at the maximum operating speed, $S_{max}$, for a predefined duration. At a fourth time 58, the controller 16 again determines an optimum speed at which the engine 22 may run to maximize fuel efficiency based on the new load 36 connected to the generator system 10. The controller 16 commands the engine 22 to begin operating at the second speed, $S_2$.

Figure 3:
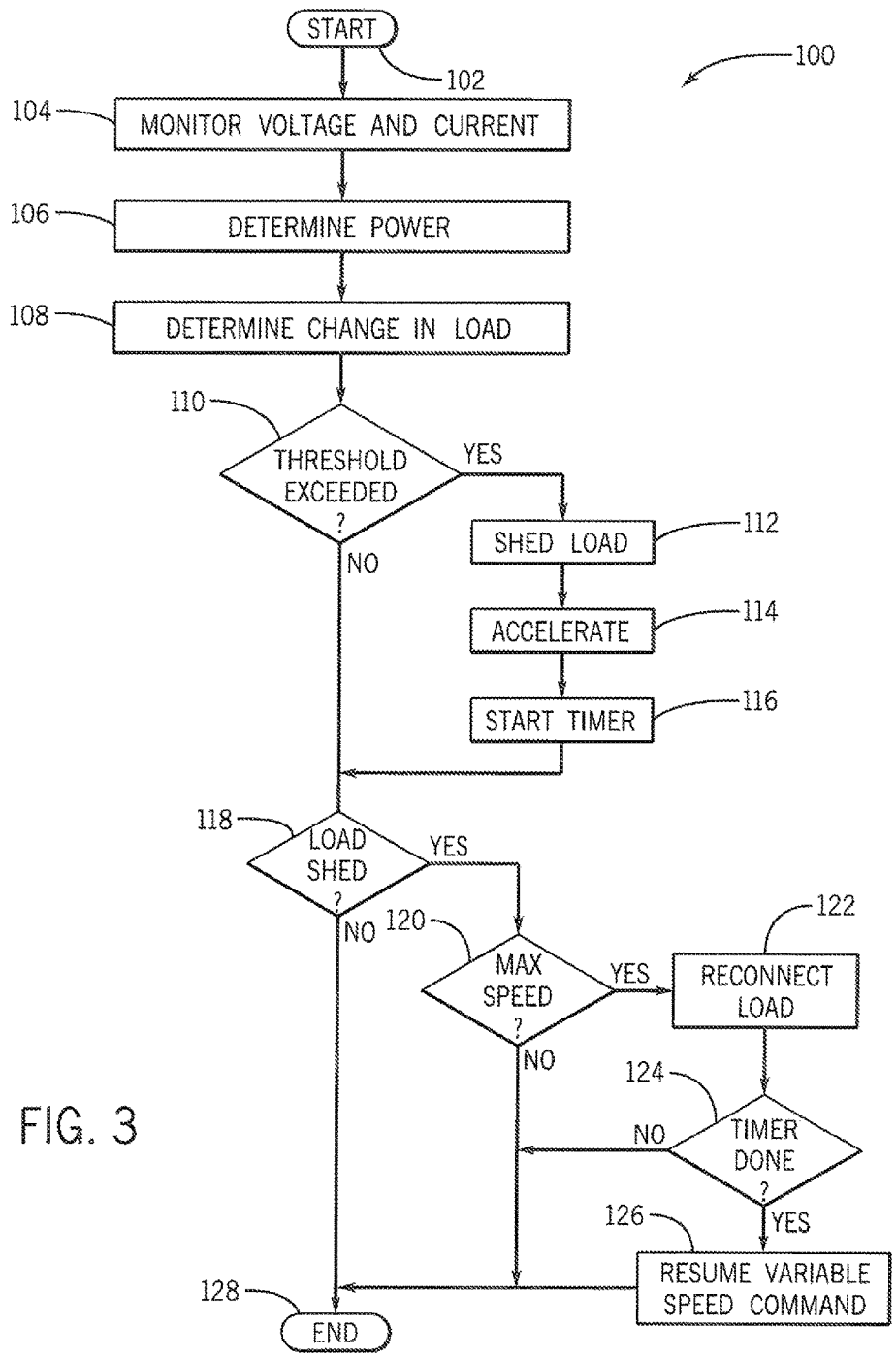
FIG. 3 is a flowchart illustrating the steps for controlling operation of the engine when an excessive load is applied according to one embodiment of the invention.

Referring next to FIG. 3, a flowchart illustrating the steps for temporarily shedding a load are illustrated. The flowchart will be discussed with respect to the controller 16 in the generator system 10; however, it is understood that a separate load-shed controller may similarly execute the steps without deviating from the scope of the invention. It is contemplated that the controller 16 executes the steps in a rapid load-shed routine 100 at a periodic interval. At step 102, the controller 16 enters the rapid load-shed routine 100. According to the illustrated embodiment, the controller 16 monitors the voltage and current and determines the power output front the stator 32 as shown in steps 104 and 106. According to an alternate embodiment, the controller 16 monitors the angular position or speed feedback signal from the engine 22 to determine the speed of the engine 22. With reference also to FIG. 1, the current transformer 35 provides the signal to the controller 16 corresponding to the current from the stator 32. A second sensor may be operatively connected at the output 33 to generate a signal corresponding to the voltage from the stator 32. The power output from the stator 32 is determined by the controller 16 as a function of the current and voltage signals. If the load 36 is a resistive load, the power is determined by multiplying the voltage and current signals together, also referred to as the real power output from the stator 32. If the load is a reactive, or non-linear, load the phase shift between the current and the voltage must also be considered. For non-linear loads 36, the controller 16 determines the reactive power output from the generator system 10. The reactive power may be determined by calculating a power factor of the AC output from the generator system 10, where the power factor is determined based on the relationship between the electrical phase of the current and the electrical phase of the voltage at the output 33 of the stator 32. The controller 16 is, therefore, configured to determine a value of both the real power and the reactive power output from the stator 32.

Based on the power calculations, the controller 16 determines whether to shed a load 36 (i.e., disconnect the load 36 from the generator system 10). At step 108, the controller 16 determines the magnitude of a change in the load 36. According to the illustrated embodiment, the magnitude of change in the load 36 is based on the change in the amount of power output from the generator system 10. According to the alternate embodiment discussed above, if the controller 16 determines the speed of the engine 22, the magnitude of change in the load 36 may be based on the amount the engine speed decreases. A threshold value of either the change in power or the decrease in speed may be stored in the generator system 10. The value may be stored either in memory included with the controller 16 or on a separate memory device. The value may be loaded into the controller with the load-shed routine 100 and/or may be set independently with an operator interface device. At step 110, the load-shed routine 100 compares the change in power or the decrease in speed to the preset threshold to determine whether it has been exceeded. If the controller 16 determines that the change in power and/or speed did not exceed a preset threshold, execution of the load-shed routine 100 continues at step 118. If the threshold has been exceeded, the controller 16 outputs the control signal 38 to the switch 40 to disconnect the load 36, or loads 36, from the generator system 10, as shown in step 112. The controller 16 may also set an internal status bit indicating that it has initiated a rapid load-shed event. Having removed the load 36 and, therefore, the extra power drawn from the generator system 10 that was causing the engine 22 to slow, the controller 16 then commands the engine 22 to accelerate up to maximum operating speed, as shown in step 114.

In order to prevent the engine 22 speed from decreasing too much, it is desirable to detect the change in power and/or speed rapidly. According to one embodiment of the invention, therefore, the change in power is detected within two electrical cycles of the AC power after connecting the additional load 36. In the U.S. at 60 Hz generation, the change is detected within 33.3 milliseconds. According to another embodiment of the invention, the controller 16 monitors the current and voltage levels and determines the power output from the generator system 10 at least one time per each half cycle of the AC power. The controller 16 then compares the AC power output from the generator system 10 at each subsequent half cycle to determine the change in the magnitude of the load 36.

In order to avoid a potential for speed cycling in the engine 22, the controller 16 may start a timer to keep the engine 22 operating at the maximum speed for a predefined time after accelerating to maximum speed, as shown in step 116. The time may be stored either in memory included with the controller 16 or on a separate memory device. The time may be loaded into the controller with the load-shed routine 100 and/or may be set independently with an operator interface device. If no delay is desired, the time may be set to zero.

At step 118, the controller 16 determines whether a load-shed event was initiated. The controller 16 may check the internal status bit, if utilized, to determine that the load-shed event was initiated. If not, the controller 16 may end the load-shed routine 100 at step 128. If the load-shed was initiated, the controller 16 next determines whether the engine 22 is operating at maximum speed, as shown in step 120. If the engine 22 has not yet reached maximum operating speed, the load-shed routine 100 may end at step 128. If the engine 22 has reached maximum operating speed, the controller outputs another control signal 38 to the switch 40 to reconnect the load 36 or loads 36 which were disconnected in order to allow the engine 22 to accelerate to maximum speed, as shown at step 122. The controller 16 may next check if the timer to keep the engine 22 operating at the maximum speed is done, as shown in step 124. If not, the load-shed routine 100 may end at step 128. If the timer is complete, the controller 16 may resume variable speed operation of the engine 22. An optimum engine speed may be determined as discussed above and the optimum engine speed command is provided to the engine 22. The load-shed routine 100 then ends at step 128.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the invention. The embodiments described herein explain the best modes known for practicing the invention and will enable others skilled in the art to utilize the invention.

I claim:

1. A method of controlling an engine-driven, electrical generator system configured to generate an alternating current (AC) power at a desired output frequency for a plurality of electrical loads, comprising the steps of:
   determining a value of the AC power output by the generator system at least once during each electrical cycle of the AC power;
   detecting a change in the value of the AC power output greater than a preset threshold;
   opening a switch to disconnect at least one of the electrical loads from the generator system responsive to detecting the change in the value of the AC power output greater than the preset threshold;
   accelerating the engine to a maximum operating speed; and
   closing the switch to reconnect the at least one electrical load to the generator system upon acceleration of the engine to the maximum operating speed.

2. The method of claim 1 further comprising the step of generating a control signal responsive to detecting the change in the value of the AC power output, wherein the control signal is provided to the switch to open and close the switch.

3. The method of claim 1 further comprising the steps of
   operating the engine at the maximum operating speed for a predefined time after accelerating to the maximum operating speed; and
   varying an operating speed of the engine as a function of fuel consumption of the generator system upon completion of the predefined time.

4. The method of claim 1 wherein the step of detecting the change in the value of the AC power output is done within two electrical cycles of the AC power from connecting an additional load to the generator system.

5. The method of claim 4 wherein the step of determining the value of the AC power output further comprises the steps of:
   monitoring an amplitude of a current and an amplitude of a voltage output by the generator system;
   determining the AC power output as a function of the amplitude of current and the amplitude of voltage during a first electrical half cycle; and
   determining the AC power output as a function of the amplitude of current and the amplitude of voltage during a second electrical half cycle, wherein the second electrical half cycle immediately follows the first electrical half cycle.

6. The method of claim 4 wherein the step of determining the value of the AC power output further comprises the steps of:
   monitoring an amplitude of a current and an amplitude of a voltage output by the generator system;
   determining a power factor of the AC power output by the generator system as a function of the amplitude of the current output and of the amplitude of the voltage during a first electrical half cycle; and
   determining a power factor of the AC power output by the generator system as a function of the amplitude of the current output and of the amplitude of the voltage during a second electrical half cycle, wherein the second electrical half cycle immediately follows the first electrical half cycle.

7. A method of controlling an engine-driven, electrical generator system, wherein an engine of the generator system is configured to operate at an engine speed and the generator system is configured to generate an alternating current (AC) power having a desired output frequency, the method comprising the steps of:
   running the engine at a first engine speed;
   connecting a load to an output of the generator system;
   detecting a change in a value of the AC power output greater than a preset threshold within two electrical cycles of the AC power;
   disconnecting at least a portion of the load from the output of the generator system;
   accelerating the engine to a maximum operating speed; and
   reconnecting the disconnected portion of the load to the output of the generator system upon acceleration of the engine to the maximum operating speed.

8. The method of claim 7 further comprising the step of generating a control signal responsive to detecting the change in the value of the AC power output, wherein the control signal is provided to a switch to disconnect and reconnect the portion of the load from the output of the generator.

9. The method of claim 7 further comprising the steps of:
   operating the engine at the maximum operating speed for a predefined time after accelerating to the maximum operating speed; and
   varying the operating speed of the engine as a function of fuel consumption after reconnecting the disconnected portion of the load.

10. The method of claim 7 wherein the step of detecting the change in the value of the AC power output further comprises the steps of:
    monitoring an amplitude of a current and an amplitude of a voltage at the output of the generator system;
    determining the AC power as a function of the amplitude of current and the amplitude of voltage during a first electrical half cycle;
    determining the AC power as a function of the amplitude of current and the amplitude of voltage during a second electrical half cycle, wherein the second electrical half cycle immediately follows the first electrical half cycle; and
    comparing the AC power during the first electrical half cycle to the AC power during the second electrical half cycle.

11. The method of claim 7 wherein the step of detecting the change in the value of the AC power output further comprises the steps of:
monitoring an amplitude of a current and an amplitude of a voltage at the output of the generator system;
determining a power factor of the AC power as a function of the amplitude of the current output and of the amplitude of the voltage during a first electrical half cycle;
determining a power factor of the AC power as a function of the amplitude of the current output and of the amplitude of the voltage during a second electrical half cycle, wherein the second electrical half cycle immediately follows the first electrical half cycle; and
comparing the power factor during the first electrical half cycle to the power factor during the second electrical half cycle.

12. A method of controlling an engine-driven, electrical generator system, wherein an engine of the generator system is configured to operate at an engine speed and the generator system is configured to generate an alternating current (AC) power having a desired output frequency, the method comprising the steps of:
running the engine at a first engine speed;
connecting a load to an output of the generator system;
detecting a decrease in the engine speed greater than a preset threshold;
disconnecting at least a portion of the load from the output of the generator system;
accelerating the engine to a maximum operating speed; and
reconnecting the disconnected portion of the load to the output of the generator system upon acceleration of the engine to the maximum operating speed.

13. The method of claim 12 further comprising the step of generating a control signal responsive to detecting the decrease in the engine speed, wherein the control signal is provided to a switch to disconnect and reconnect the portion of the load from the output of the generator.

14. The method of claim 12 further comprising the steps of:
operating the engine at the maximum operating speed for a predefined time after accelerating to the maximum operating speed; and
varying the operating speed of the engine as a function of fuel consumption after reconnecting the disconnected portion of the load.

15. The method of claim 12 wherein the step of detecting the decrease in the engine speed is done within two electrical cycles of the AC power from connecting the load to the output of the generator system.

* * * * *